Figure 1:
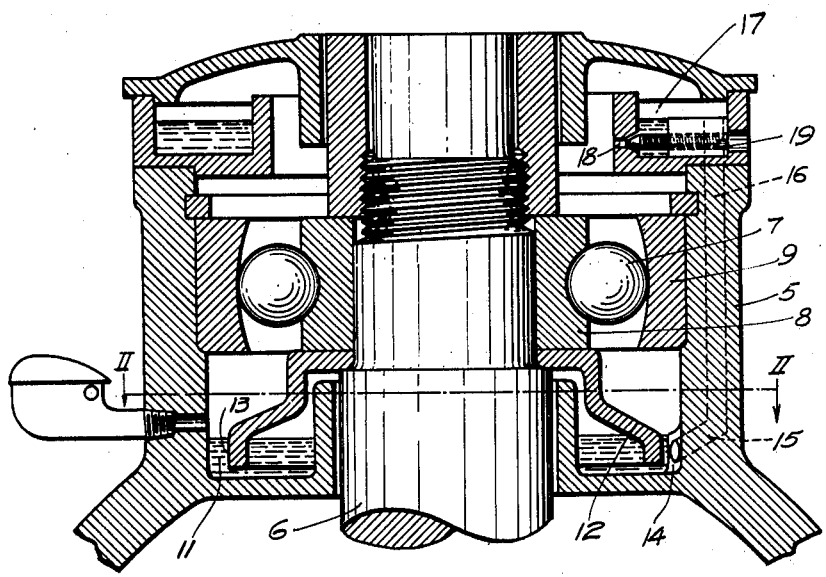

July 28, 1931. O. WILDE 1,816,507
OIL BEARING LUBRICATION
Filed Dec. 14, 1928 2 Sheets-Sheet 1

INVENTOR
Oskar Wilde
BY
Wesley G. Carr
ATTORNEY

July 28, 1931.   O. WILDE   1,816,507
OIL BEARING LUBRICATION
Filed Dec. 14, 1928   2 Sheets-Sheet 2

INVENTOR
Oskar Wilde
BY
Wesley G. Carr
ATTORNEY

Patented July 28, 1931

1,816,507

UNITED STATES PATENT OFFICE

OSKAR WILDE, OF VIENNA, AUSTRIA, ASSIGNOR TO WESTINGHOUSE ELECTRIC & MANUFACTURING COMPANY, A CORPORATION OF PENNSYLVANIA

OIL BEARING LUBRICATION

Application filed December 14, 1928, Serial No. 325,959, and in Austria December 15, 1927.

My invention relates to bearings, and more particularly to a circulatory lubrication system of vertical oil bearings utilized in connection with electric motors.

In electric motors, especially in motors used for driving machine tools which are operated at high speeds, it is important that the bearings thereof have a reliable system of lubrication.

A constant flow of lubricant over the bearing surfaces must be maintained at all speeds, and, for best efficiency, the amount of the lubricant should not be any more than that required by the bearing for best lubrication at any speed. Accelerated circulation of the liquid, if permitted, will tend to overheat the lubricant and possibly cause ultimate overheating of the bearing.

Furthermore, in vertical machine tool motors, it is often advantageous to utilize the motor sometimes in a reversed position; that is, under some operations, the end of the shaft to which the tool is connected may be on top of the motor, while in other operations, it would be underneath the motor.

It is an object of my invention to provide a lubrication system for a vertical oil bearing, in which the bearing parts may receive a constant and predetermined flow of oil irrespective of the speed at which the machine tool is operating.

It is a further object of my invention to provide a lubricating device for utilization in connection with the bearing for vertical machine tool motors, wherein circulation of oil over the bearing surfaces is maintained when the bearing is turned upside-down.

In accordance with my invention, I provide a lubricating system whereby the oil in the bottom of the bearing housing is forced to a level higher than the bearing parts into an oil chamber, from which the oil is supplied to the bearing surfaces by gravity, and the amount of oil supplied to the bearing surfaces may be regulated by means of an adjustable throttle.

A still further object of my invention is to provide pumping means comprising a cup-shaped member which is carried by the shaft and which is partially submerged in the body of oil within the bearing housing, the outer periphery of the cup being close to the housing wall, whereby, upon rotation, it will produce a whirling or churning action in the oil. By means of a lug on the wall projecting into the path of the whirling oil, a certain amount of oil is diverted and forced into a passageway or cooling space.

By experiment, it is found that, for a motor operating at 1400 revolutions per minute, the rim velocity of the cup being 1875 feet per minute, the liquid was lifted as high as 16 inches in a column ⅜ of an inch in diameter.

Figure 2:
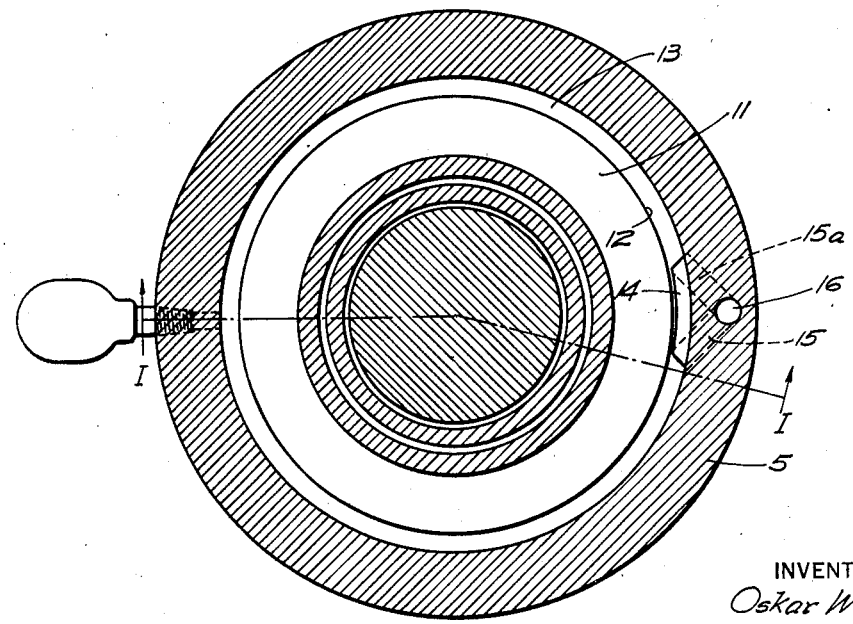
Figure 3:
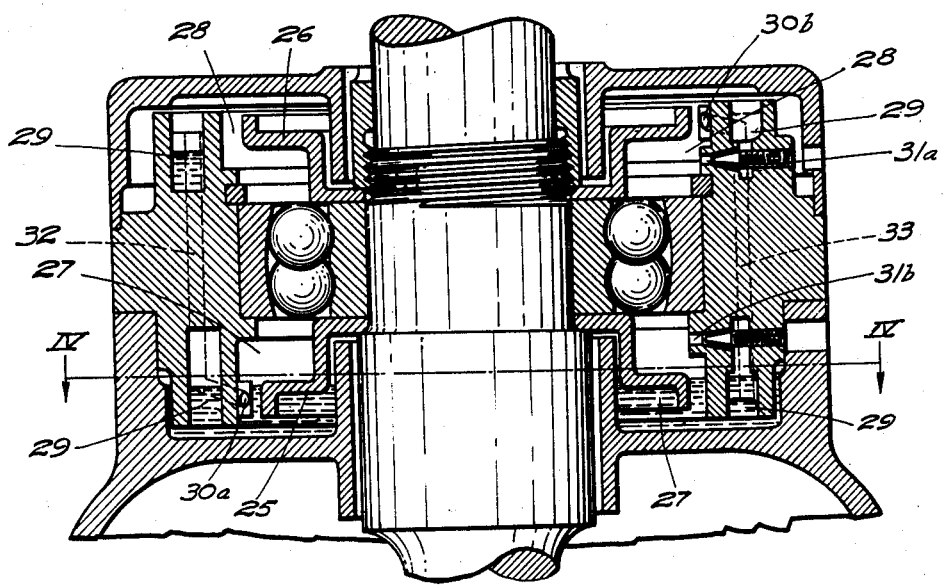
Figure 4:
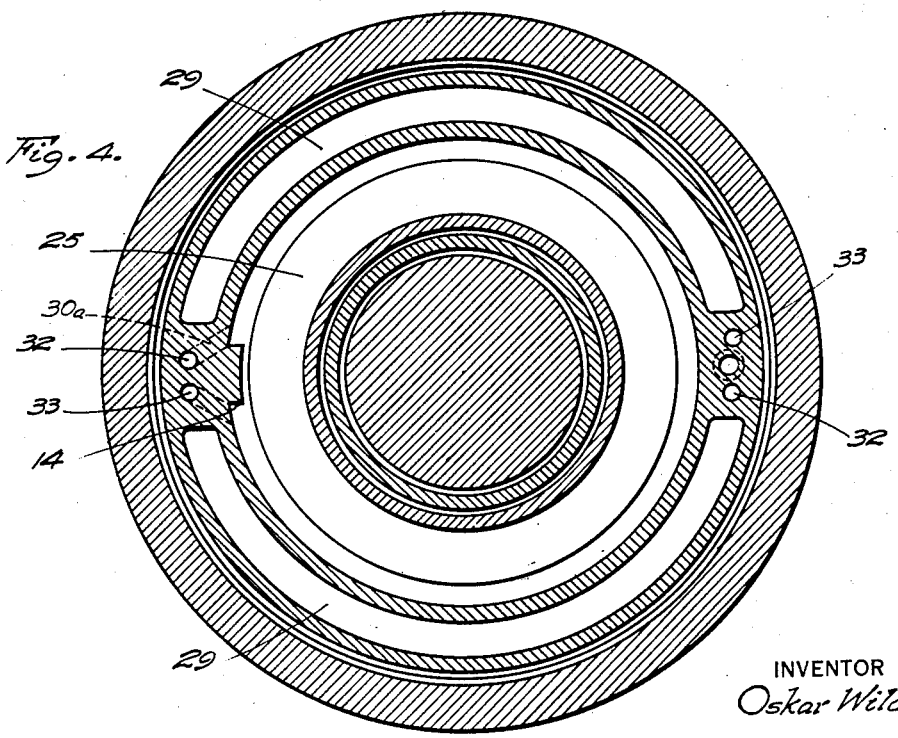

For a better understanding of my invention, reference may be had to the accompanying drawings, in which Figure 1 is a vertical sectional view of a vertical oil bearing embodying my invention, Fig. 2 is a horizontal sectional view of the vertical bearing, taken on the line II—II of Figure 1, and looking in the direction of the arrows, Fig. 3 is a vertical sectional view of a vertical oil bearing, illustrating my reversable system of oil lubrication, and Fig. 4 is a horizontal sectional view of the construction shown in Fig. 3, taken on the line IV—IV thereof.

In Figure 1 is shown a vertical oil bearing comprising a stationary bearing housing 5, which is disposed around one end of a shaft 6 and houses a ball bearing arrangement comprising balls 7, an inner race 8, and an outer race 9. The bottom of the housing constitutes a sump containing a body of oil 11, in which is disposed an inverted cup-shaped member 12, that is carried by the shaft, its outer periphery 13 being close to the housing wall, so that, upon rotation, a churning and whirling action is set up in the body of the liquid between the periphery of the cup and the wall.

A projection or lug 14, integral with the housing wall, is disposed in the path of the whirling oil, whereby a portion of the oil is caught and forced into an inclined channel 15, whence it is forced upwardly through a passageway 16 into an oil chamber 17 which is located at a higher level than the bearing parts.

The collector lug 14 may be provided with two oppositely directed inclined channels 15 and 15a, as shown in Figure 2, so that oil may be collected at the same portion, but, at opposite edges, when churning action takes place in either direction of rotation. For example, as shown in Figure 2, the oil is collected in the channel 15 when the shaft is rotated in a counter-clockwise direction, and in the channel 15a when it is rotated in a clockwise direction.

In order to prevent the oil from flowing back through the vertical passage-way 16, the latter preferably extends up above the level of the liquid in the chamber 17.

From the chamber 17, the oil is preferably discharged to the ball bearing through a nozzle 18, the cross-section of which can be adjusted by means of an adjusting screw or nozzle 19. In this manner, the amount of oil discharged from the chamber and delivered to the bearing surfaces can be regulated independently of the flow of oil in the vertical passage-way 16. The oil, after passing over the bearing surfaces, is finally returned to the base of the housing where it collects at 11, and from which it may be re-circulated. The adjustment of the screw 19 can be made from the outside of the bearing housing, and the lubrication may thus be regulated for various speeds, kinds of oil, etc.

In Figure 3, I show my preferred form of construction for utilization with the machine-tool motors wherein the motor and bearing may be inverted. The operation of this construction is similar to the operation of the bearing shown in Figure 1, explained above, except for modifications whereby the motor may be sufficiently lubricated when disposed in an inverted position.

The parts of the bearing housing shown in Figs. 3 and 4 are made symmetrical with respect to a horizontal plane passing centrally through the ball races. Thus, there are two cup-shaped centrifugal throwover-members 25 and 26, one for the lower chamber 27 and the other for the upper chamber 28 which is substantially identical with the lower chamber 27 inverted, so that it may serve as the lower chamber when the bearing is turned upside down. Around the periphery of each chamber is an annular storage reservoir 29, either of which may serve as the upper chamber when it is on top. Each of the chambers 27 and 28 is provided with its own collector spaces 30 so that whichever chamber is at the bottom may deliver oil to the upper storage reservoir 29. In like manner, each of the storage reservoirs 29 has its own discharge opening 31 through which the top reservoir may discharge oil into the ball bearings.

A preferable arrangement for the collector channels 29 is shown in Figure 4, wherein separate vertical passage-ways 32 and 33 are utilized. In such structure, a greater pressure of the oil in the vertical passage-way is obtained, than in the structure shown in Figs. 1 and 2, since a portion of the oil is not diverted or drawn back into the oil body through either of the spaces 15 or 15a, whichever one is not in use, as in the first described construction.

When the motor is in the upright position, the oil is forced by the lower rotating cup 25 into the collector space 30a and forced up to the upper chamber 28. The oil is then throttled back into the housing, over the bearing surfaces by means of throttling device 31a.

When the machine is inverted, the oil is collected at the collector space 30b of the chamber 28 by reason of the action of the other rotating cup member 26, and thus it is forced into one of the oil passage-ways 32 or 33 and collected in the chamber 27 from which it is throttled by means of throttling device 31b therein.

I claim as my invention:

1. A bearing having a lubricant-circulating device comprising a collector chamber at each end of the bearing and, when the bearing is disposed with one end higher than the other, the collector chamber at the higher end lying higher than the bearing and means at each end of the bearing to pump lubricant to the collector chamber at the other, the lubricant being supplied to the bearing surfaces by gravity.

2. The combination with a vertical rotatable shaft adapted to be operated with either end uppermost, of a bearing therefor, a housing for said bearing having chambers above and below the bearing, the upper chamber being substantialy the same as the lower chamber inverted, so that it may serve as the lower chamber when the shaft is inverted, members carried by the shaft on each side of the bearing and having means projecting towards the end of the bearing housing so as to cause a rotation of the oil in whichever chamber is lowermost, an outlet passage-way from each chamber extending approximately tangentially from the portion which is adapted to carry the rotating body of oil, means for conducting oil from each outlet passage-way and applying it to the more remote end of the bearing, which is then the uppermost end.

3. The combination with a vertical rotatable shaft adapted to be operated with either end uppermost, of a bearing therefor, a housing for said bearing having chambers above and below the bearing, the upper chamber being substantially the same as the lower chamber inverted, so that it may serve as the lower chamber when the shaft is inverted, an annular storage reservoir disposed around the periphery of each of said chambers, either of which may serve as a top reservoir, according to which end of the shaft is uppermost, members carried by the shaft on each side of the bearing and having means projecting towards the end of the bearing housing to cause a movement of the oil in whichever chamber is lowermost, an outlet passage-way from each chamber extending approximately tangentially from the portion which is adapted to carry the moving body of oil, means for conducting oil from each outlet passage-way and carrying it around the bearing to the annular reservoir at the other end of the housing, and a restricted discharge passage-way from each annular reservoir to the bearing.

4. A bearing having a lubricant-circulating system comprising a lubricant reservoir at each end of the bearing, lubricant pumping means at each end of the bearing, a lubricant-collecting chamber at each end of the bearing, and means between each of the collecting chambers and the bearing to regulate the flow of lubricant from the collecting chamber to the bearing.

5. A vertical-shaft bearing having an oil-storage chamber at the bottom thereof, a second oil-storage chamber at the top thereof, automatic oil-circulating means for conveying oil from said bottom storage chamber to the top storage chamber, and means for gravitationally feeding oil from said top storage chamber to the top extremity of the bearing surfaces, characterized by an adjustable throttle member interposed in the oil-circulation path between said top storage chamber and said bearing surfaces to be lubricated.

6. The invention, as defined in claim 5, characterized by the fact that the oil-circulating means for raising the oil to the top storage chamber comprises a pipe extending above the level of oil in said top chamber, whereby a return-flow of oil through said circulating means is prevented.

7. A vertical-shaft bearing having an oil-storage chamber at the top thereof, automatic oil-circulating means for raising oil from the bottom of the bearing surface to said storage chamber, and means, including an adjustable throttle member and an overflow path by-passing said throttle member, for gravitationally feeding oil from said storage chamber to the top of the bearing surface.

In testimony whereof, I have hereunto subscribed my name this 28th day of November, 1928, at Vienna, Austria.

OSKAR WILDE.